United States Patent
Hsu et al.

(10) Patent No.: US 9,069,528 B2
(45) Date of Patent: Jun. 30, 2015

(54) JACKING DEVICE FOR ASSISTING AN ELECTRIC APPARATUS WITH MOVEMENT

(75) Inventors: An Szu Hsu, New Taipei (TW); Chien Cheng Mai, New Taipei (TW); Way Han Dai, New Taipei (TW)

(73) Assignee: First Dome Corporation, New Taipei (TW)

( * ) Notice: Subject to any disclaimer, the term of this patent is extended or adjusted under 35 U.S.C. 154(b) by 252 days.

(21) Appl. No.: 13/587,052

(22) Filed: Aug. 16, 2012

(65) Prior Publication Data

US 2013/0219660 A1 Aug. 29, 2013

(30) Foreign Application Priority Data

Feb. 24, 2012 (TW) .............................. 101106436 A
Mar. 9, 2012 (TW) .............................. 101108205 A (51) Int. Cl.
*G06F 1/16* (2006.01)

(52) U.S. Cl.
CPC ............ *G06F 1/1637* (2013.01); *G06F 1/1681* (2013.01); *Y10T 16/5457* (2015.01)

(58) Field of Classification Search
CPC ................................ A47G 1/24; G06F 1/1624
USPC ......... 248/685, 463, 461, 462, 917–924, 460, 248/682, 454, 455; 361/679.09, 679.15, 361/679.12, 679.02, 679.06, 679.08, 361/679.21, 679.27, 679.28
See application file for complete search history.

(56) References Cited

U.S. PATENT DOCUMENTS

| | | | |
|---|---|---|---|
| 6,288,891 B1 * | 9/2001 | Hasegawa et al. ........ | 361/679.07 |
| 6,585,217 B2 * | 7/2003 | Huang et al. .................. | 248/455 |
| 7,085,129 B2 * | 8/2006 | Hsu ........................... | 361/679.08 |
| 7,150,440 B2 * | 12/2006 | Yuan ........................... | 248/372.1 |
| 7,631,841 B1 * | 12/2009 | Yen et al. ...................... | 248/121 |
| 8,077,151 B2 * | 12/2011 | Morooka ....................... | 345/168 |
| 8,154,868 B2 * | 4/2012 | Xu ............................ | 361/679.55 |
| 8,179,668 B2 * | 5/2012 | Wei et al. ................. | 361/679.09 |
| 8,328,153 B2 * | 12/2012 | Yang et al. ..................... | 248/370 |
| 8,770,538 B2 * | 7/2014 | Hsu et al. ...................... | 248/685 |
| 2004/0008473 A1 * | 1/2004 | Lee ................................ | 361/680 |
| 2006/0252471 A1 * | 11/2006 | Pan ........................... | 455/575.4 |
| 2011/0134595 A1 * | 6/2011 | Wei et al. ................. | 361/679.09 |
| 2012/0176738 A1 * | 7/2012 | Wei ........................... | 361/679.01 |
| 2012/0307441 A1 * | 12/2012 | Hung et al. .............. | 361/679.09 |
| 2013/0016468 A1 * | 1/2013 | Oh ............................ | 361/679.12 |
| 2013/0088826 A1 * | 4/2013 | Kim ......................... | 361/679.09 |
| 2014/0049891 A1 * | 2/2014 | Lee et al. ................. | 361/679.15 |
| 2014/0139987 A1 * | 5/2014 | Onda ....................... | 361/679.02 |

* cited by examiner

*Primary Examiner* — Nkeisha Smith
(74) *Attorney, Agent, or Firm* — Rosenberg, Klein & Lee (57) ABSTRACT

A jacking device for assisting an electric apparatus with movement is operated in a labor-saving way, thereby simplifying complicated operational conditions occurred in conventional skills. The electric apparatus includes a machine body module, a motion module, and a support arm disposed between the motion module and the machine body module. The support arm includes a pivot end and a push end utilized to transmit power to the jacking device. The jacking device includes a slave portion receiving the power transmitted from the push end of the support arm and a link portion pivoted to the slave portion. The link portion includes a free end motioned between a first position and a second position to drive the motion module for rotation and upward or downward movement when the slave portion is motioned in response to the power transmitted from the push end of the support arm.

31 Claims, 10 Drawing Sheets

JACKING DEVICE FOR ASSISTING AN ELECTRIC APPARATUS WITH MOVEMENT

BACKGROUND OF THE INVENTION

1. Field of the Invention

The invention relates to a jacking device for assisting an electric apparatus with movement, in particular relates to a jacking device utilizing a combination of a slave portion and a link portion to assist a machine body or module in producing rotation and upward or downward movement.

2. Description of the Related Art

Devices, utilizing a slide module (or a motion module) which is capable of being reciprocally moved and freely rotated by an external force to be assembled on a system module of an electric apparatus (e.g., mobile phones, laptops, personal digital assistant, digital camera and electronic-books, etc.), are generally known as conventional skills. For example, the slide module of the electric apparatus such as a screen can be motioned for sliding and rotating movements to perform opening and closing functions.

In these slide modules or portions, an assembly including a slide rail, a moving module and a rotary component with a swivel is generally applied. Energy release and storage effects provided by elastic rings, elastic fasteners or springs are cooperated to assist these slide module or motion modules (e.g., the screen) in moving and reversing, thereby performing functions such as opening, closing and rotating operations. In this configuration, it is advantageous that the angle of the slide module (or the screen) is adjustable. However, it is defective that the screen is easily wobbled when the screen is provided for touch-controlled operations, and it is still required to perform a two-stage sliding and rotating operation so as to locate the screen at a user's desired operating position. For example, "Portable Computing Device Having An Adjustable Hinge" in U.S. Pat. No. 5,548,478 is a typical case providing the above-described skills.

In conventional skills, a slide cover module or a screen supported by (three-bar to four-bar) linkage mechanism is disclosed. In this configuration, it is advantageous that the slide cover module or the screen provided with back support is convenient fir the user's touch-controlled operations. However, it is defective that the operation angel of the screen cannot be adjusted, and a large force shall be applied to lift the screen and the linkage mechanism to a desired operation position. For example, "Portable Electronic Apparatus Having A Cover Device With A Stand Unit for Supporting A User Interface Device" in U.S. Pat. No. 6,700,775 is an exemplary case providing the above-described skills.

Also, in conventional skills, a skill of using a support element to replace the above-described linkage mechanism for supporting the slide cover module or the screen is disclosed, such as an executable case of "Portable Computer" in U.S. Pat. No. 7,184,263 B1 (corresponding to Taiwan Patent No. 95101867). In 263' case, a support element is configured between a slide cover module (or a motion module) and a machine body module, including a first end pivoted to a rear end of the machine body module and a second end pivoted to a back region of the slide cover module. The slide cover module has one end assembled on a slide rail of the machine body module. When the slide cover module is pushed to move along the slide rail of the machine body module, the slide cover module also drives the support element to rotate about two pivot points (i.e., the first and second ends of the support element), thus to support the slide cover module by the support element.

One topic related to structure designs of the above-described cases (e.g., U.S. Pat. Nos. 6,700,775 and 7,184,263 (or Taiwan Patent No. 95101867)) is that the two-stage sliding and rotating operation shall be performed so as to locate the screen at the user's desired operating position, and the large force shall be applied to pull the screen and the linkage mechanism so that the screen can be lifted to the desired operation position. Physically speaking, if the weight of the slide module is approximately presumed as 400 grams, an operator must apply a force (or a horizontal thrust force) of greater than 4.2 kilograms to overcome resistance generated from the pivot pattern of the support element, the slide cover module and the machine body module, so that the slide cover module could be pushed for sliding and the support element could be rotated. However, it is laborious for users such as the feminine or child to operate the slide cover module, and this operation condition is certainly not our expectations.

Representatively speaking, the disclosures of the above-mentioned reference data reveal the conditions of usage and structural design of the slide cover module and the machine body module or other components connected therewith. If the structure and above-described applications of the slide cover module and the machine body module or other components connected therewith can be properly redesigned and reconsidered, the use pattern of the slide cover module can be advancedly altered, thus to be distinguished from conventional products and methods. The following exemplary topics related to the structure design of a slide cover module shall be at least considered.

Firstly, in conventional skills such as in U.S. Pat. No. 7,184,263 B1 (corresponding to Taiwan Patent No. 95101867), when the slide cover module is operably moved by the operator, a pulling force often must be simultaneously applied to rotate the slide cover module so as to reduce the horizontal thrust force (4.2 kilograms), i.e., a two-stage sliding and rotating operation shall be performed the slide cover module. Therefore, this conventional operation pattern shall be promoted when redesigning a structure assembly of the slide cover module and the machine body module. For example, in a preferred structure design of the slide cover module and the machine body module, when the slide cover module is pushed by the operator, the other end of the slide cover module shall be provided with functions of automatic rotation and upward movement, so that laborious and complicate operations occurred in conventional skills can be improved.

Secondly, in conventional skills, the linkage mechanism or the support element (particularly referring to the first end of the support element which is pivoted on the machine body module) which simply provides rotation function, i.e., it cannot additionally provide an action force to drive the other end of the slide cover module to automatically generate rotation and upward movement.

Thirdly, in conventional skills, the structure of the linkage mechanism or the first end of the support element pivoted on the rear end of the machine body module must be promoted. The reason is that, because of the first end of the support element to be configured on the rear end of the machine body module, no operating space is provided in the horizontal direction to assist the other end of the slide module in producing rotation and upward movement.

However, the above-described topics do not physically taught or implied in the cited reference data.

BRIEF SUMMARY OF THE INVENTION

In view of this, the purpose of the invention is to provide a jacking device for assisting an electric apparatus with movement. The electric apparatus includes a machine body module, a motion module, and a support arm disposed between the motion module and the machine body module. The support arm includes a pivot end and a push end utilized to transmit power to a jacking device. The jacking device includes a slave portion communicating or receiving the power transmitted from the push end of the support arm of the electric apparatus and a link portion pivoted to the slave portion. The link portion includes a free end capable of being motioned between a first position and a second position to drive the motion module of the electric apparatus for rotation and upward or downward movement when the slave portion is motioned in response to the power transmitted from the push end of the support arm of the electric apparatus. Thus, the jacking device of the invention can be operated in a labor-saving way, thereby simplifying complicated operational conditions occurred in conventional skills.

According to the jacking device for assisting the electric apparatus of the invention, an elastic device is configured between the slave portion and the link portion. When the slave portion is motioned in response to the action force transmitted from the push end of the support arm of the electric apparatus, the elastic device stores energy therein so as to motion the free end of the link portion from the first position toward the second position. On the other hand, when the action force applied on the first end of the slave portion is removed, the energy stored in the elastic device is released therefrom so as to drive the slave portion and the link portion back to their initial position.

According to the jacking device for assisting the electric apparatus of the invention, the slave portion comprises a first end capable of producing rotation and linear movement and a second end pivoted on the link portion. Further, the link portion further comprises a fixation end disposed on a seat. The first end of the slave portion is connected to the push end of the support arm of the electric apparatus. When the first end of the slave portion is motioned in response to the action force transmitted from the push end of the support arm of the electric apparatus, the slave portion pushes the link portion for rotation, and the free end of the link portion is motioned between the first position and the second position so as to push the motion module for rotation and upward or downward movement.

According to the jacking device for assisting the electric apparatus of the invention, the slave portion is configured with at least one convex portion, at least one concave portion and an inclined surface formed between the convex portion and the concave portion. The link portion is configured with at least one ridge portion, at least one valley portion, and an inclined side formed between the ridge portion and the valley portion, corresponding to the convex portion and the concave portion of the slave portion. When the slave portion is motioned in response to the action force transmitted from the push end of the support arm of the electric apparatus, the convex portion of the slave portion gradually enters into the valley portion of the link portion, and the inclined surface of the slave portion is pressingly act the inclined side of the link portion to drive the link portion and the free end thereof for rotation, thus to push the motion module for rotation and upward or downward movement.

According to the jacking device for assisting the electric apparatus of the invention, the slave portion comprises a serration section, and the link portion comprises a (partial) gear zone correspondingly connected or engaged to the serration section of the slave portion. When the slave portion is motioned in response to the action force transmitted from the push end of the support arm of the electric apparatus, the serration section of the slave portion drives the gear zone of the link portion to rotate the link portion and the free end thereof, thus to push the motion module for rotation and upward movement.

According to the jacking device for assisting the electric apparatus of the invention, the slave portion is a type of flexible body. When the slave portion is motioned in response to the action force transmitted from the push end of the support arm of the electric apparatus, the slave portion upwardly pushes the link portion along the rail of the seat, thereby driving the motion module for rotation and upward or downward movement.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
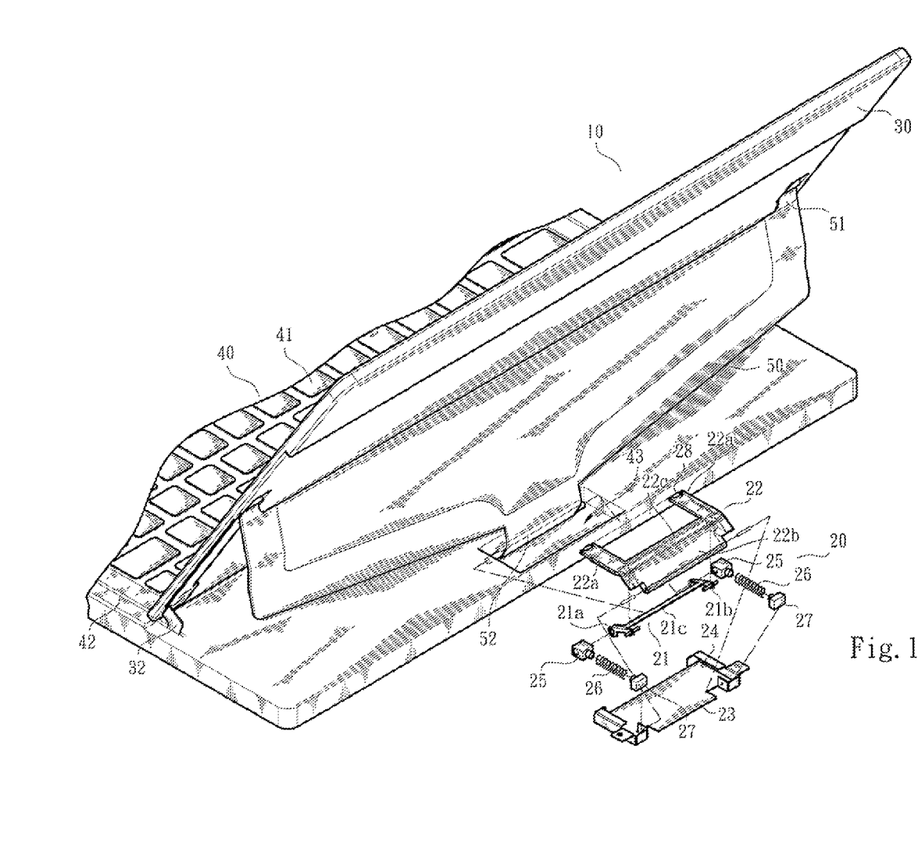
FIG. 1 is an exploded schematic view of a structure of an embodiment of the invention, in which a condition of structure configuration of an electric apparatus, a support arm, a slave portion and a link portion is illustrated.
Figure 2:
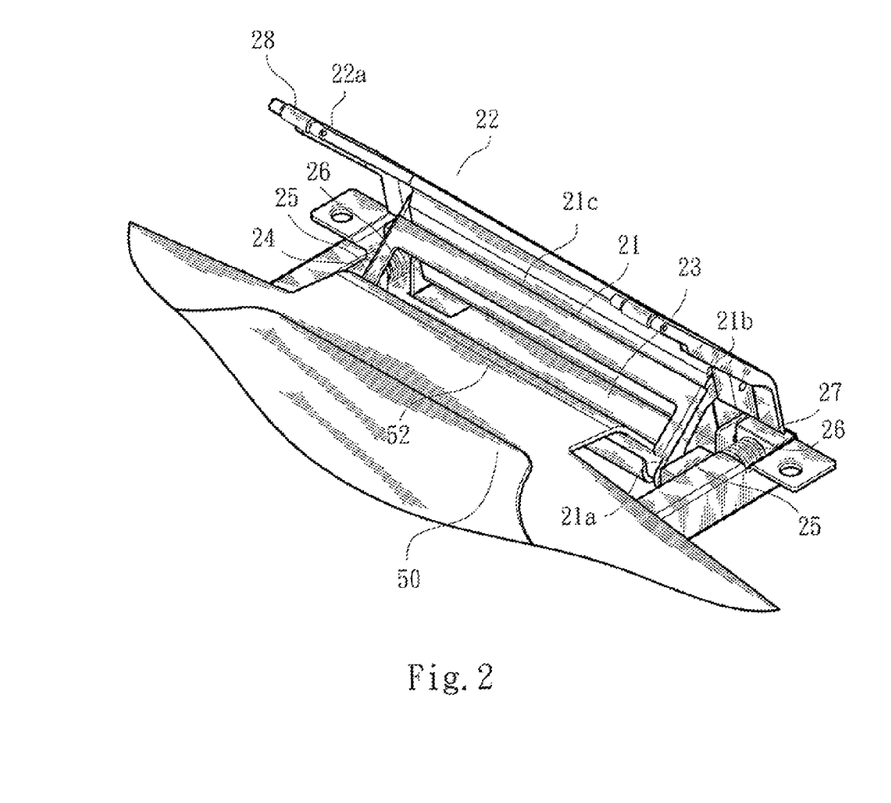
FIG. 2 is an assembled schematic view of the structure of FIG. 1, in which an combination relationship of the support arm, the slave portion and the link portion is illustrated.

Referring to FIGS. 1 and 2, the invention discloses a jacking device for assisting an electric apparatus with movement, and a combination of the jacking device and the electric apparatus is provided, in which the jacking device and the electric apparatus are generally denoted by reference numbers 10 and 20, respectively. The electric apparatus 10 is selected from type of a table personal computer (table PC) or a portable computer, comprising a motion module 30 (e.g., a slide cover or screen), a machine body module 40 provided with an operation region 41 (e.g. a keyboard or message input device), and a support arm 50 disposed between the motion module 30 and the machine body module 40 and comprising a pivot end 51 and a push end 52. The pivot end 51 of the support arm 50 is rotatably pivoted on the motion module 30 of the electric apparatus 10, and the push end 52 of the support arm 50 at least movably pushes or transmits power to the jacking device 20. The related contents will be described in detail hereinafter.

In FIGS. 1 and 2, with respect to the electric apparatus 10, the machine body module 40 comprises two sides which are respectively configured with groove tracks 42, and the motion module 30 comprises two sides which are respectively configured with pivot implements 32 correspondingly pivoted to the groove tracks 42 of the machine body module 40. Accordingly, the motion module 30 is slidable and rotatable on the machine body module 40 (or the groove track 42).

With respect to the electric apparatus 10, it is needed to further explain that the machine body module 40 of the electric apparatus 10 is defined or provided with an operating region or a space 43 for the push end 52 of the support arm 50. That is, the jacking device 20 and the support arm 50 are arranged in the space 43 defined by the machine body module 40 of the electric apparatus 10. Further, in the electric apparatus 10, an operating region or a section of length or distance is formed from the push end 52 of the support arm 50 to a rear end of the machine body module 40, so that the push end 52 of the support arm 50 is allowed to move and rotate in the operating region or the space 43 defined by the machine body module 40 of the electric apparatus 10.

Referring again to FIGS. 1 and 2, the jacking device 20 comprises a slave portion 21 and a link portion 22 pivoted to the slave portion 21, in which the slave portion 21 communicates or receives the power transmitted from the push end 52 of the support arm 50 of the electric apparatus 10, and the link portion 22 comprises a free end 22a which is motionable between a first position and a second position to drive the motion module 30 of the electric apparatus 10 for rotation, upward or downward movement when the slave portion 21 is motioned in response to the power transmitted from the push end 52 of the support arm 50 of the electric apparatus 10.

In an preferred embodiment of the invention, the slave portion 21 is formed by type of a rod-like article or plate-like article, comprising a first end 21a and a second end 21b pivoted to the link portion 22. When the first end 21a of the slave portion 21 is communicated or received the power transmitted from the push end 52 of the support arm 50 of the electric apparatus 10, the first end 21a of the slave portion 21 is capable of being rotated and linearly motioned (or shifted) along a (horizontal) reference axis x (see FIG. 3).

FIGS. 1 and 2 also illustrate that the link portion 22 is formed by type of a rod-like article or plate-like article. The link portion 22 further comprises a fixation end 22b. The second end 21b of the slave portion 21 is rotatably pivoted at a position located between the fixation end 22b and the free end 22a of the link portion 22. Accordingly, when the first end 21a of the slave portion 21 receives an external force or the power transmitted from the push end 52 of the support arm 50 of the electric apparatus 10, the link portion 22 pushed by the second end 21b of the slave portion 21 is rotated by taking the fixation end 22b thereof as a spindle pivot, and the free end 22a of the link portion 22 is motioned between the first position and the second position so as to push the motion module 30 for rotation and upward or downward movement.

In the adopted embodiment of the invention, the first end 21a of the slave portion 21 and the fixation end 22b of the link portion 22 are disposed on a seat 23 configured with a rail 24, and the slave portion 21 is motioned along the rail 24 of the seat 23, i.e., the first end 21a of the slave portion 21 is movable and rotatable along the rail 24 of the seat 23. In the adopted embodiment of the invention, the first end 21a of the slave portion 21 is rotatably disposed on a slide portion 25 which is freely movably installed in the rail 24 of the seat 23, so that the powder or the action force transmitted from the push end 52 of the support arm 50 of the electric apparatus 10 is allowed to push the slide portion 25 for movement and rotation.

In an executable embodiment, the seat 23 and the rail 24 thereof are arranged in on the machine body module 40 (or in the space 43 defined by the machine body module 40) of the electric apparatus 10, and the push end 52 of the support arm 50 of the electric apparatus 10 and the slave portion 21 are formed by type of connection, so that the power generated from the motion module 30 can be transmitted to the first end 21a of the slave portion 21 once the motion module 30 is motioned. In the adopted embodiment, the push end 52 of the support arm 50 of the electric apparatus 10 and the first end 21a of the slave portion 21 are formed by a coaxial pivot type.

In FIGS. 1 and 2, it is appeared that the slave portion 21 formed by a symmetry type comprises a connecting portion 21c connected between two slave portions 21, and also the link portion 22 formed by a symmetry type comprises a connecting portion 22c connected between two link portions 22. In accordance with the symmetrical types of the slave portion 21 and the link portion 22, the seat 23 is correspondingly configured with two rails 24 formed by a symmetry type.

Figure 3:
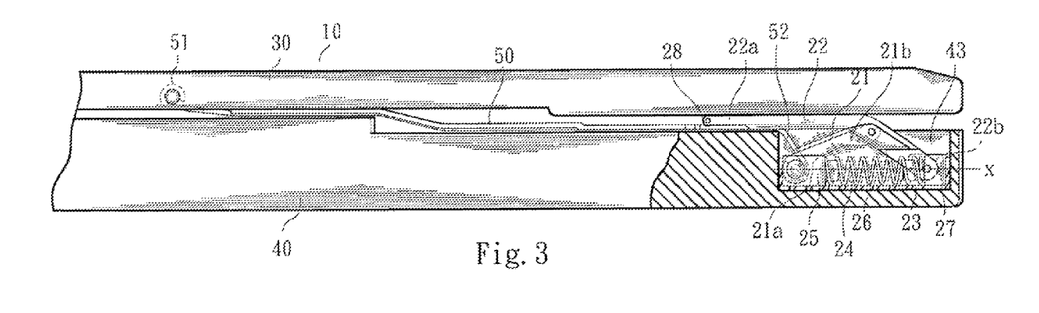
FIG. 3 is an assembled sectional schematic view of the structure of FIG. 1, illustrating that the slave portion and the link portion are located at a first position.

Referring to FIGS. 1, 2 and 3, in a preferred embodiment, an elastic device 26 is configured between the first end 21a of the slave portion 21 and the fixation end 22b of the link portion 22. When the first end 21a of the slave portion 21 is motioned in response to the action force transmitted from the push end 52 of the support arm 50 of the electric apparatus 10, the elastic device 26 stores energy therein so as to motion the free end 22a of the link portion 22 from the first position toward the second position. On the other hand, when the powder or the action force applied on the first end 21a of the slave portion 21 is removed, the energy stored in the elastic device 26 is released therefrom so as to drive the slave portion 21 and the link portion 22 back to their initial position.

In the adopted embodiment, the elastic device 26 is selectively formed by type of a helical spring, comprising two ends respectively fixed at positions which are located between the first end 21a of the slave portion 21 and the fixation end 22b of the link portion 22. Specifically speaking, the fixation end 22b of the link portion 22 is configured with a fixation portion 27 which has two ends respectively fixed on the slide portion 25 and the fixation portion 27.

Figure 4:
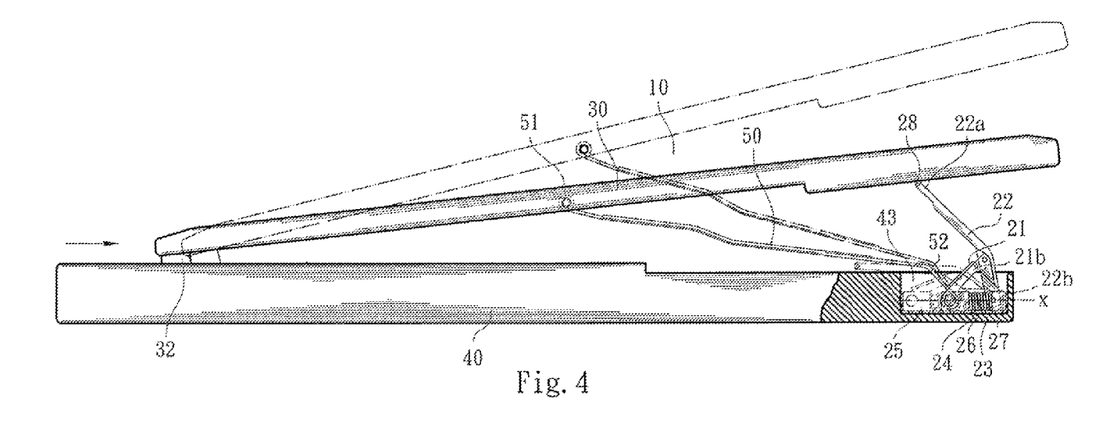
FIG. 4 is a schematic view of an operative embodiment of the invention, illustrating that a motion module is pushed for movement as well as the slave portion and the link portion are motioned from a first position toward a second position.

Referring to FIGS. 3 and 4, a movement condition of the slave portion 21, the link portion 22 and the elastic device 26 is illustrated. The position of the slave portion 21 and the link portion 22 (illustrated in FIG. 3) is defined as a first position or an initial position, and the position of the slave portion 21 and the link portion 22 (illustrated in FIG. 4) is defined as a second position.

In FIGS. 3 and 4, when an operator pushes the motion module 30 to motion rightward (on the paper sheet of FIGS. 10 and 11) along the groove track 42 (see FIG. 1), an action force transmitted from the push end 52 of the support arm 50 of the electric apparatus 10 pushes the first end 21a of the slave portion 21 and the slide portion 25 to shift along the rail 24 or the reference axis x, thus to force the elastic device 26 to store energy therein. Moreover, when the second end 21b of the slave portion 21 pushes the link portion 22 for movement, from the first position toward the second position, by taking the fixation end 22b thereof as a spindle pivot, the free end 22a of the link portion 22 jacks up the motion module 30, so that the motion module 30 can be rotated by taking the pivot end 51 of the support arm 50 as a spindle pivot (in FIG. 4). Accordingly, it is contributive to reduce the horizontal thrust force to be applied, thereby attaining labor-saving effect and facilitating the operator to successively push the motion module 30.

Referring also to FIG. 4, with the rotation and upward movements of the motion module 30, the motion module 30 gradually leaves from the free end 22a of the link portion 22, and the action force which is transmitted from the support arm 80 to be exerted on the first end 21a of the slave portion 21 is gradually reduced. Accordingly, the elastic device 26 gradually releases the stored energy therefrom so as to drive the slave portion 21 and the link portion 22 back to their initial position (e.g., as the condition illustrated by imaginary lines in FIG. 4).

Figure 5:
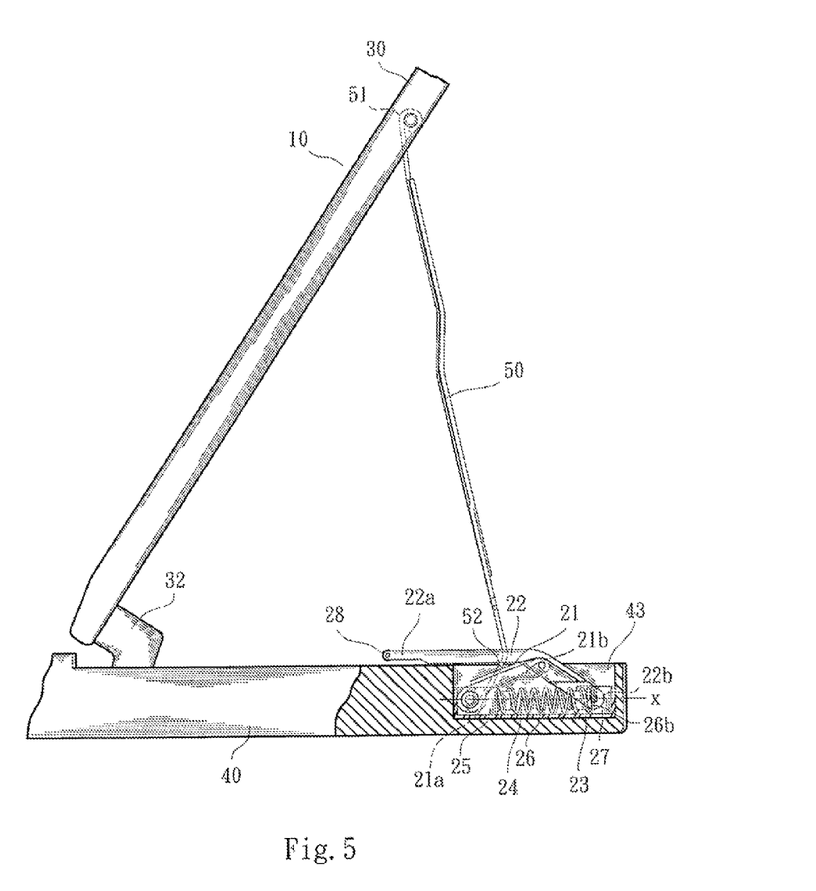
FIG. 5 is a schematic view of another operative embodiment of the invention, illustrating that a motion module is moved to a setting position as well as the motion module supported by the support arm is provided for user operations.

FIG. 5 particularly illustrates a condition that the motion module 30 is moved to a setting position as well as the motion module 30 supported by the support arm 50 is provided for user operations. In an executable embodiment, the free end 22a of the link portion 22 is configured with a roller 28, thus to reduce resistance or frictional force formed between the link portion 22 and the motion module 30.

It can be understood that the weights of the link portion 22 and the slave portion 21 force themselves to constantly remain at the initial position (or the first position), or return to the initial position by themselves. In a preferred consideration, with the energy released from the elastic device 26, the slide portion 25 is forced to drive the slave portion 21 to cause the link portion 22 back to the initial position thereof (e.g., as the condition illustrated by imaginary lines in FIG. 4).

In a derivate embodiment, if a constant force spring (not shown in FIGs.) can be assembled between the motion module 30 and the machine body module 40 of the electric apparatus 10, the motion module 30 can be constantly pulled rightward (on the paper sheet of FIG. 5) or a position for opening by the constant force spring. When the operator pushes the motion module 30 to drive the link portion 22 to jack up the motion module 30, the constant force spring can assist in pulling the motion module 30, thereby enabling the motion module 30 to generate an automatic, labor-saving spring open.

Figure 6:
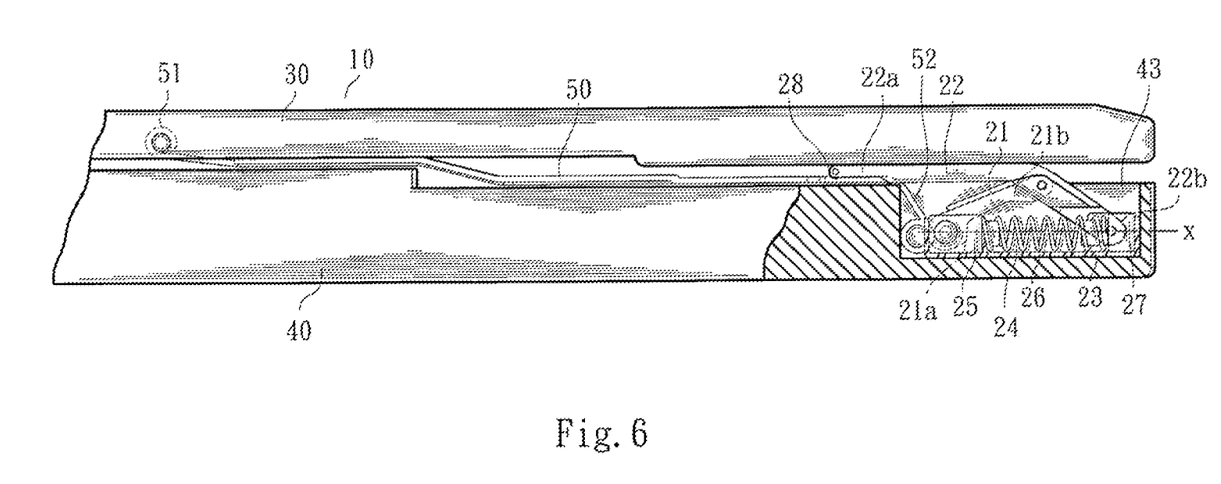
FIG. 6 is a schematic view of an executable embodiment of the invention, illustrating that a push end of a support arm and a slave portion are formed as type of a non-coaxial pivot.

Referring to FIG. 6, an executable embodiment of the invention is illustrated. In this embodiment, the push end 52 of the support arm 50 and the first end 21a of the slave portion 21 are formed by type of a non-coaxial pivot, that is, the push end 52 of the support arm 50 is arranged to contact or connect the slide portion 25 or the first end 21a of the slave portion 21, so that the slide portion 25 or the first end 21a of the slave portion 21 can receive the power transmitted from the push end 52 of the support arm 50.

Figure 7:
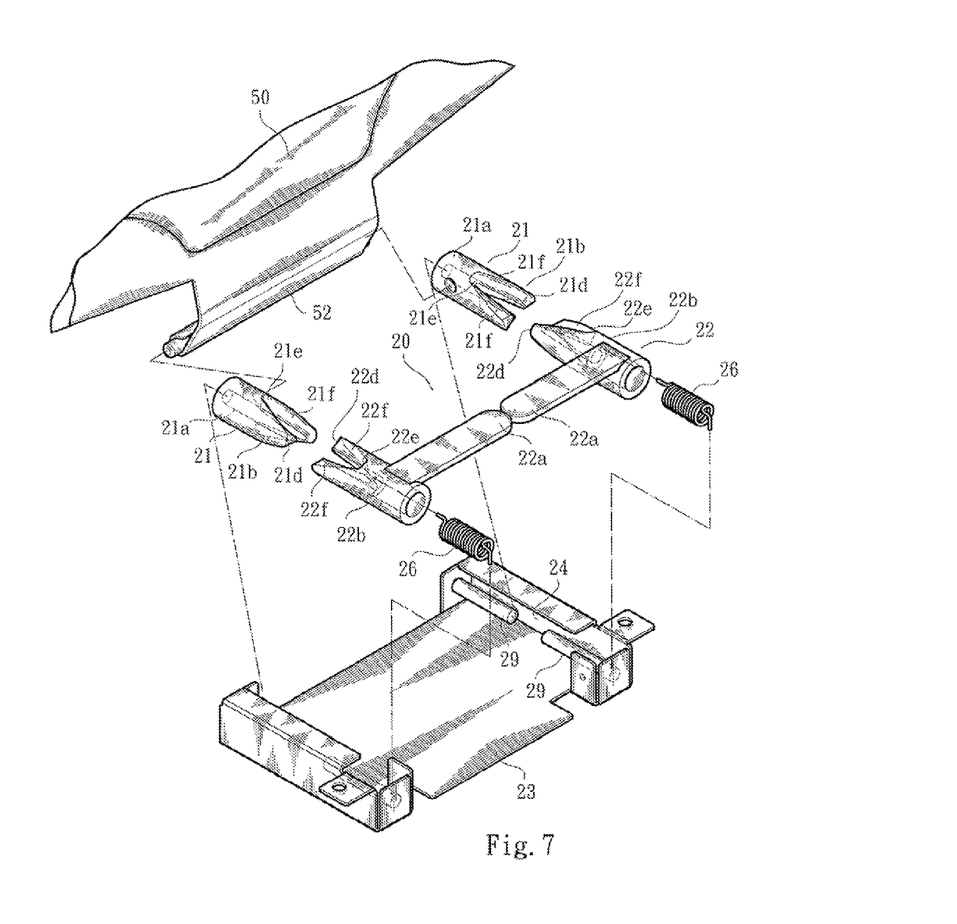
FIG. 7 is a schematic view of another executable embodiment of the invention, illustrating an arrangement relationship of a push end of a support arm and a slave portion, together with a condition of the slave portion configured with convex portions and concave portions and a link portion configured with ridge portions and valley portions.
Figure 8:
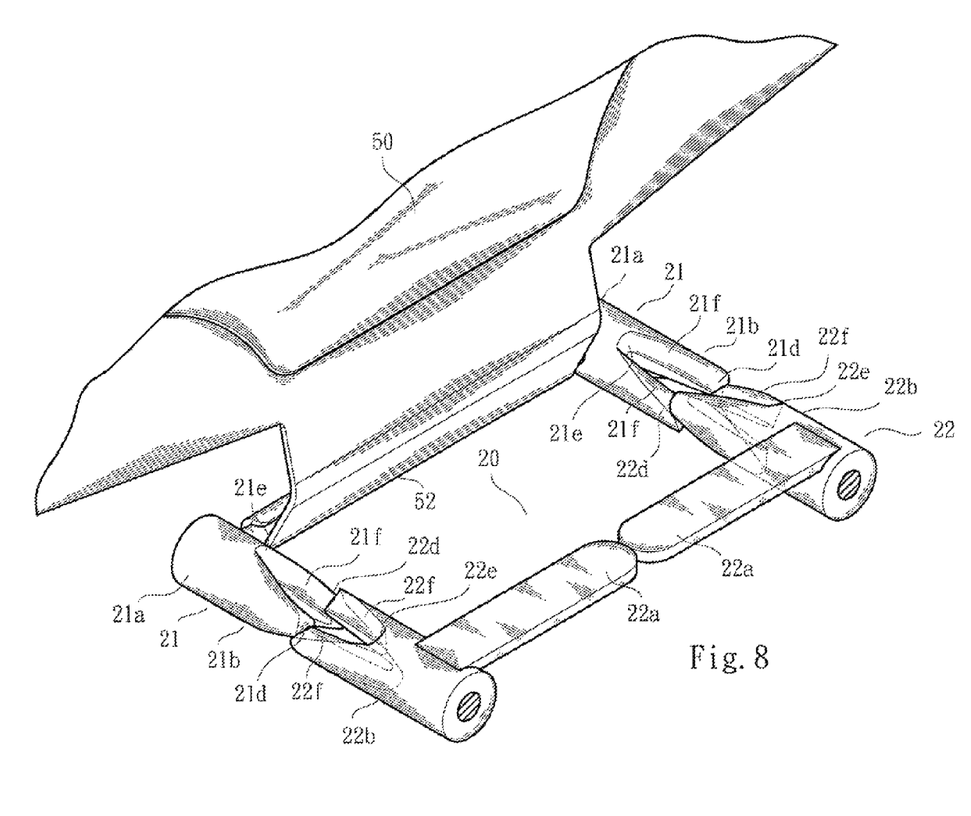
FIG. 8 is a schematic view of an operative embodiment of FIG. 7, illustrating a combination condition of the convex portions and the concave portions of the slave portion and the ridge portions and the valley portions of the link portion.
Figure 9:
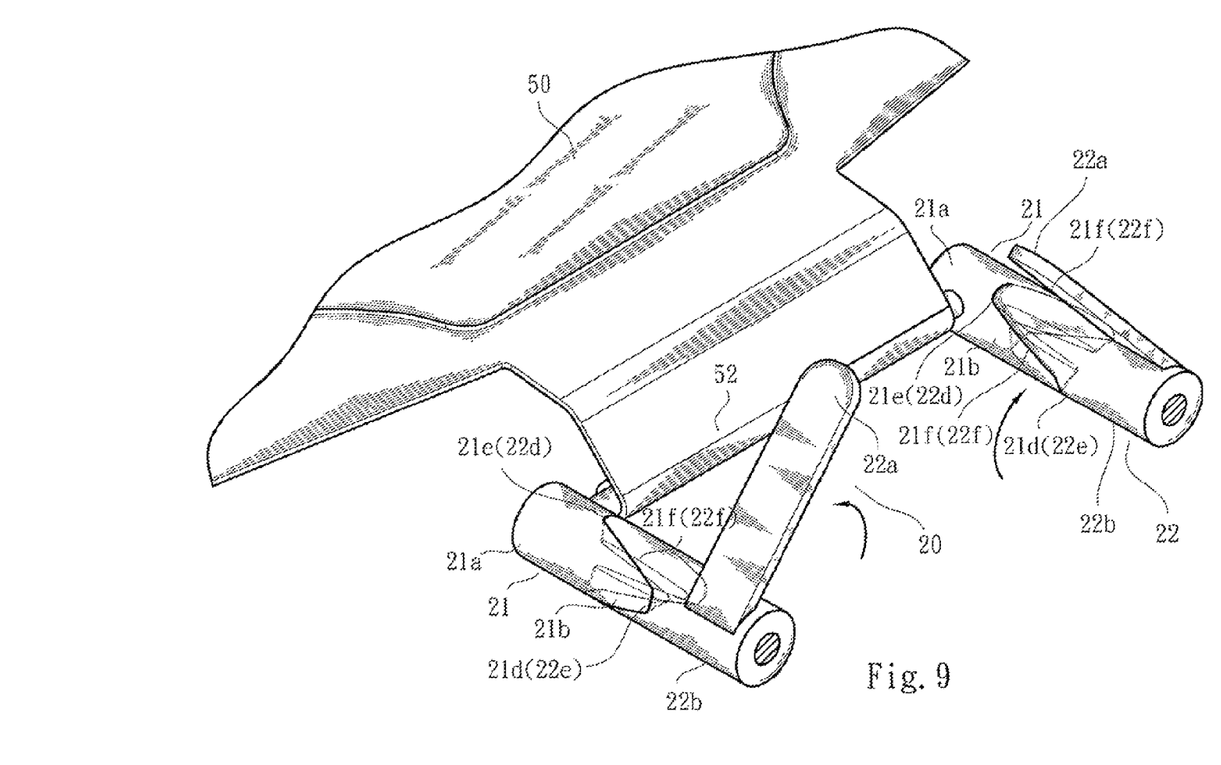
FIG. 9 is a schematic view of another operative embodiment of FIG. 7, illustrating that, when entering the convex portions of the slave portion into the valley portions of the link portion to cause inclined surfaces of the slave portion pressingly move inclined sides of the link portion, a free end of a link portion is motioned.

Referring to FIGS. 7 and 8, another executable embodiment of the jacking device 20 is disclosed. The second end 21b of the slave portion 21 is configured with at least one convex portion 21d, at least one concave portion 21e and an inclined surface 21f formed between the convex portion 21d and the concave portion 21e. Corresponded to the convex portion 21d and the concave portion 21e of the slave portion 21, the fixation end 22b of the link portion 22 is configured with at least one ridge portion 22d, at least one valley portion 22e, and an inclined side 22f formed between the ridge portion 22d and the valley portion 22e. When the slave portion 21 is motioned in response to the power or the action force transmitted from the push end 52 of the support arm 50 (or when the push end 52 of the support arm 50 pushes the first end 21a of the slave portion 21), the convex portion 21d of the slave portion 21 gradually enters into the valley portion 22e of the link portion 22. Accordingly, the inclined surface 21f of the slave portion 21 is pressingly act the inclined side 22f of the link portion 22 to drive the link portion 22 and the free end 22a thereof for rotation, thus to push the motion module 30 for rotation and upward or downward movement (e.g., as the condition illustrated in FIGS. 9 and 10).

Concretely speaking, each of the slave portion 21 and the link portion 22 is formed by type of a shaft tube, the slave portion 21 and the link portion 22 are assembled on a shaft 29 disposed on the seat 23. FIGS. 7 and 8 also illustrate the pivot condition of the first end 21a of the slave portion 21 and the push end 52 of the support arm 50. In this embodiment, the free end 22a of the link portion 22 selected from a laminate article, and the free end 22a and the fixation end 22b of the link portion 22 are formed by type of orthogonalization.

It can be understood that, when the power or the action force is removed from the push end 52 of the support arm 50, the weight of the free end 22a of the link portion 22 forces both of the link portion 22 and the slave portion 21 to return or constantly remain at the initial position thereof (as the condition illustrated in FIG. 8).

Referring again to FIGS. 7, 8, 9 and 10, in the preferred embodiment, the elastic device 26 configured on the link portion 22 comprises two ends which are respectively fixed on the fixation end 22b of the link portion 22 and the shaft 29 disposed on the seat 23. Accordingly, when the operator pushes the motion module 30 for movement, the push end 52 of the support arm 50 pushes the first end 21a of the slave portion 21, the convex portion 21d of the slave portion 21 gradually enters into the valley portion 22e of the link portion 22, and the inclined surface 21f of the slave portion 21 is forced to pressingly act the inclined side 22f of the link portion 22, thus to rotate the fixation end 22b and the free end 22a of the link portion 22 by taking the shaft 29 as a spindle pivot (e.g., the condition illustrated by imaginary lines in FIG. 10) and to drive the elastic device 26 to store energy therein.

Figure 10:
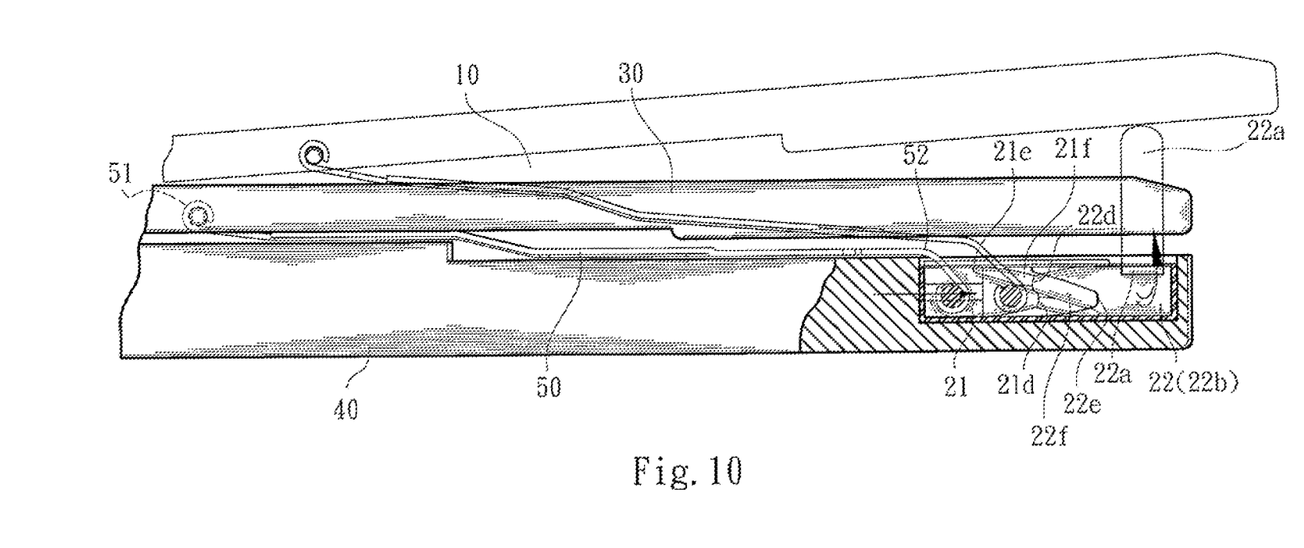
FIG. 10 is a plane schematic view of an operative embodiment of the invention, illustrating that a free end of a link portion pushes a motion module for rotation and upward movement.

When the powder or the action force applied on the push end 52 of the support arm 50 is removed, the elastic device 26 releases the stored energy therefrom so as to drive the link portion 22 to reversely push the slave portion 21 back to the initial position thereof.

Figure 11:
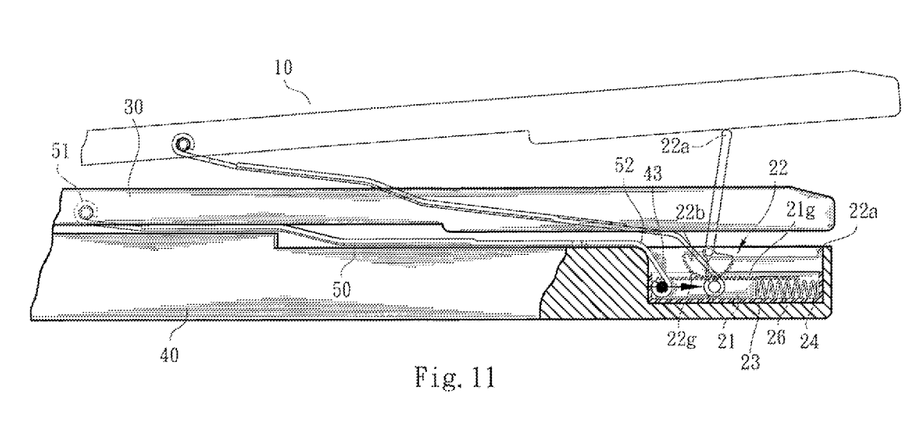
FIG. 11 is a schematic view of a derivate embodiment of the invention, illustrating that a serration section of a slave portion is connected or engaged to a gear zone of a link portion.

Referring to FIG. 11, a derivate embodiment of the jacking device 20 is disclosed. The slave portion 21 comprises a serration section 21g, and the link portion 22 comprises a (partial) gear zone 22g correspondingly connected or engaged to the serration section 21g of the slave portion 21. In the adopted embodiment, the gear zone 22g is formed on the fixation end 22b of the link portion 22.

When the slave portion 21 is motioned in response to the action force transmitted from the push end 52 of the support arm 50, the serration section 21g of the slave portion 21 drives the gear zone 22g of the link portion 22 to motion the link portion 22 and the free end 22a thereof from the first position toward the second position, thus to push the motion module 30 for rotation and upward movement.

In the executable embodiment of FIG. 11, the imaginary line shows that the elastic device 26 is desirably configured between the slave portion 21 and the seat 23 (or the rail 24 of the seat 23). When the powder or the action force applied on the push end 52 of the support arm 50 is removed, the energy stored in the elastic device 26 is released therefrom so as to drive the slave portion 21 and the link portion 22 back to their initial position.

Figure 12:
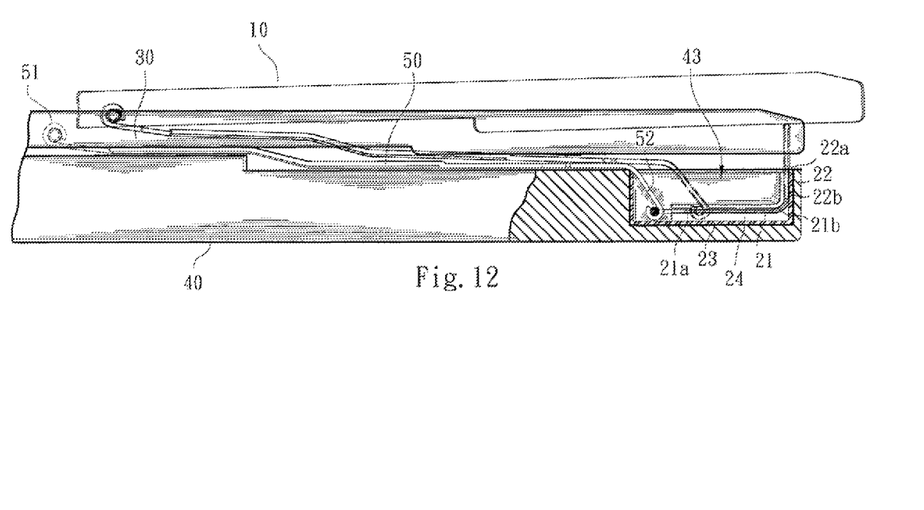
FIG. 12 is a schematic view of another derivate embodiment of the invention, illustrating a type of a slave portion formed by a flexible body, together with a condition that the slave portion pushes a link portion along a rail to drive a motion module for rotation and upward movement.

Referring to FIG. 12, another derivate embodiment of the invention is illustrated. The slave portion 21 selected from type of a flexible body is movably disposed on the rail 24 of the seat 23. When the slave portion 21 is motioned in response to the action force transmitted from the push end 52 of the support arm 50, the slave portion 21 upwardly pushes the link portion 22 along the rail 24 of the seat 23, thereby driving the motion module 30 for rotation and upward movement.

Representatively speaking, the jacking device for assisting the electric apparatus with movement is provided with the following considerations and advantages, compared to conventional skills.

Firstly, the structure and usage condition of the motion module 30, the machine body module 40, the support arm 50 and components connected therewith have been redesigned and reconsidered, capable of providing innovated use pattern to be distinguished from conventional skills. One of the examples is that, with the coupling of the slave portion 21 and the support arm 50, the slave portion 21 is capable of receiving the power or the action force transmitted from the push end 52 of the support arm 50. Another example is that, with the configuration and combination relationships of the link portion 22 and the slave portion 21, the free end 22a of the link portion 22 is motionable between the first position and the second position to push the motion module 30 for rotation and upward movement. In accordance with these features, the complicated operational conditions (e.g., disclosed in U.S. Pat. No. 77,184,263 B1 or Taiwan Patent No. 95101867) which are required to simultaneously apply forces to pull the slide module for rotation when the user pushes the slide module can be improved. Therefore, besides improving the difficulties in the operation pattern of conventional skills by the structure assembly of the invention, the invention further provides the structure design capable of driving the other end of the motion module 30 to automatically rotate and upwardly move when the user pushes the slide module or the motion module 30.

Secondly, in the actual operation processes, on the condition that the weight of the motion module 30 (or the slide module) is presumed as 400 grams and the electric apparatus 10 is assembled with the jacking device 20, when the user pushes the motion module 30 to drive the support arm 50 to simultaneously to push the slave portion 21 and the link portion 22 until the motion module 30 pushed by the free end 22a of the link portion 22 of the jacking device 20 is lifted up to 10 millimeters, the horizontal thrust force applied on the motion module 30 by the user is approximately equal to 2.6 kilograms. If the motion module 30 pushed by the free end 22a of the link portion 22 of the jacking device 20 is lifted up to 20 millimeters, the horizontal thrust force applied on the motion module 30 by the user is approximately equal to 1.4 kilograms. It is understood that the values of the two horizontal thrust forces above is much less than that (4.2 kilograms) used in conventional arts. Therefore, with the above-described effects of the invention, the laborious operation conditions occurred in conventional arts can be greatly improved, and particularly users such as the feminine or child can operate the structure assembly of the invention in a labor-saving way.

Thirdly, with the structure pattern of the motion module 30, the machine body module 40, and the support arm 50 combined with the slave portion 21 of the jacking device 20, the push end 52 of the support arm 50 can be simultaneously rotated and moved so as to generate a driving force to drive the slave portion 21. Accordingly, the insufficient functions in conventional skills, such as the linkage mechanism or the support element (particularly referring to the first end of the support element which is pivoted on the machine body module) which simply provides rotation function, i.e., it cannot additionally provide the driving force or action force to drive the other end of the slide cover module to automatically generate rotation and upward movement, can be improved in accordance with the features of the invention.

Fourthly, with the operating region or space 43 provided by the machine body module 40, the push end 52 of the support arm 50 is allowed to move on the machine body module 40 by cooperating with the slave portion 21 and the link portion 22. Accordingly, the insufficient structure relationships and effects in conventional skills, such as the linkage mechanism or the first end of the support element configured at the rear end of the machine body module in which no operating space is provided in the horizontal direction to assist the other end of the slide module in producing rotation and upward movement, can be promoted or even redesigned in accordance with the features of the invention.

In conclusion, the invention provides a jacking device to effectively assist the electric apparatus with movement, featuring of a unique spatial pattern different from conventional skills and incomparable advantages and inventiveness.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A jacking device for assisting an electric apparatus with movement, the electric apparatus comprising a machine body module, a motion module capable of being moved and rotated on the machine body module, and a support arm disposed between the motion module and the machine body module and comprising a pivot end and a push end, in which the push end of the support arm at least movably transmits power to the jacking device, the jacking device comprising:
   a slave portion receiving the power transmitted from the push end of the support arm of the electric apparatus; and
   a link portion pivoted to the slave portion, comprising a free end capable of being motioned between a first position and a second position to push the motion module of the electric apparatus for movement when the slave portion is motioned in response to the power transmitted from the push end of the support arm of the electric apparatus;
   wherein the machine body module of the electric apparatus is defined with a space, the jacking device and the support arm are arranged in the space defined by the machine body module of the electric apparatus, and a distance is formed from the push end of the support arm of the electric apparatus to a rear end of the machine body module of the electric apparatus, so that the push end of the support arm is allowed to move and rotate in the space defined by the machine body module of the electric apparatus.

2. The jacking device for assisting the electric apparatus with movement as claimed in claim 1, wherein the slave portion comprising a first end and a second end pivoted on the link portion, and the first end of the slave portion receiving the power transmitted from the push end of the support arm of the electric apparatus is motioned on a reference axis.

3. The jacking device for assisting the electric apparatus with movement as claimed in claim 2, wherein the link portion further comprises a fixation end, and the second end of the slave portion is rotatably pivoted at a position located between the fixation end and the free end of the link portion.

4. The jacking device for assisting the electric apparatus with movement as claimed in claim 3, wherein the first end of the slave portion and the fixation end of the link portion are disposed on a seat which is configured with a rail, and the slave portion is motioned along the rail.

5. The jacking device for assisting the electric apparatus with movement as claimed in claim 4, wherein the first end of the slave portion is rotatably disposed on a slide portion which is freely movably installed in the rail of the seat, so that the push end of the support arm of the electric apparatus is allowed to push the slide portion.

6. The jacking device for assisting the electric apparatus with movement as claimed in claim 4, wherein the seat and the rail configured therewith are disposed in a space defined by the machine body module of the electric apparatus, and the push end of the support arm of the electric apparatus and the first end of the slave portion are formed by type of connection.

7. The jacking device for assisting the electric apparatus with movement as claimed in claim 4, wherein the push end of the support arm of the electric apparatus and the first end of the slave portion are formed by a coaxial pivot type.

8. The jacking device for assisting the electric apparatus with movement as claimed in claim 3, wherein an elastic device is configured between the first end of the slave portion and the fixation end of the link portion.

9. The jacking device for assisting the electric apparatus with movement as claimed in claim 1, wherein the slave portion and the link portion are disposed on a seat which is configured with a rail, and the slave portion is motioned along the rail.

10. The jacking device for assisting the electric apparatus with movement as claimed in claim 9, wherein the seat and the rail configured therewith are disposed in a space defined by the machine body module of the electric apparatus, and the push end of the support arm of the electric apparatus and the slave portion are formed by type of connection.

11. The jacking device for assisting the electric apparatus with movement as claimed in claim 1, wherein the slave portion formed by a symmetry type further comprises a connecting portion connected between two slave portions, and the link portion formed by a symmetry type further comprises a connecting portion connected between two link portions.

12. The jacking device for assisting the electric apparatus with movement as claimed in claim 1, wherein the slave portion and the link portion are disposed on a seat which is configured with a rail, and the rail of the seat is symmetrical to the slave portion and the link portion.

13. The jacking device for assisting the electric apparatus with movement as claimed in claim 1, wherein the free end of the link portion is configured with a roller.

14. The jacking device for assisting the electric apparatus with movement as claimed in claim 1, wherein the link portion is constantly remained at the first position via weight thereof.

15. The jacking device for assisting the electric apparatus with movement as claimed in claim 1, wherein a constant force spring is assembled between the motion module and the machine body module of the electric apparatus.

16. The jacking device for assisting the electric apparatus with movement as claimed in claim 1 further comprising a slide portion, and the push end of the support arm of the electric apparatus and the slide portion are formed by a contact type.

17. The jacking device for assisting the electric apparatus with movement as claimed in claim 1, wherein the slave portion comprises a first end which receives the power transmitted from the push end of the support arm of the electric apparatus and a second end which is pivoted on the link portion and configured with at least one convex portion, at least one concave portion and an inclined surface formed between the convex portion and the concave portion, and the link portion further comprises a fixation end which is configured with at least one ridge portion, at least one valley portion, and an inclined side formed between the ridge portion and the valley portion, corresponding to the convex portion and the concave portion of the slave portion.

18. The jacking device for assisting the electric apparatus with movement as claimed in claim 17 further comprising a seat and a shaft disposed on the seat, each of the slave portion and the link portion is formed by type of a shaft tube, and the slave portion and the link portion are assembled on the shaft disposed on the seat.

19. The jacking device for assisting the electric apparatus with movement as claimed in claim 18, wherein the seat is configured with a rail, and the shaft is disposed on the rail.

20. The jacking device for assisting the electric apparatus with movement as claimed in claim 18, wherein the link portion is configured between an elastic device comprising two ends which are respectively fixed on the fixation end of the link portion and the shaft disposed on the seat.

21. The jacking device for assisting the electric apparatus with movement as claimed in claim 17, wherein the free end of the link portion is formed by type of a laminate article, and the free end and the fixation end of the link portion are formed by type of orthogonalization.

22. The jacking device for assisting the electric apparatus with movement as claimed in claim 17, wherein the link portion and the slave portion are constantly located at the first position via weight of the free end of the link portion.

23. The jacking device for assisting the electric apparatus with movement as claimed in claim 1, wherein the slave portion comprises a serration section, and the link portion further comprises a gear zone which is correspondingly engaged to the serration section of the slave portion.

24. The jacking device for assisting the electric apparatus with movement as claimed in claim 23, wherein the link portion further comprises a fixation end, and the gear zone is formed on the fixation end of the link portion.

25. The jacking device for assisting the electric apparatus with movement as claimed in claim 23, wherein the slave portion and the link portion are disposed on a seat, and an elastic device is disposed between the slave portion and the seat.

26. The jacking device for assisting the electric apparatus with movement as claimed in claim 1, wherein the slave portion comprising a type of a flexible body is movably disposed on a rail to push the link portion for movement.

27. The jacking device for assisting the electric apparatus with movement as claimed in claim 1, wherein the machine body module of the electric apparatus comprises two sides which are at least configured with a groove track, and the motion module of the electric apparatus comprises two sides which are at least configured with a pivot implement corresponding to the groove track of the machine body module of the electric apparatus, so that the motion module is movable and rotatable on the machine body module by engagement of the groove track and the pivot implement.

28. The jacking device for assisting the electric apparatus with movement as claimed in claim 1, wherein the machine body module of the electric apparatus comprises an operation region.

29. The jacking device for assisting the electric apparatus with movement as claimed in claim 1, wherein the pivot end of the support arm is rotatably pivoted on the motion module of the electric apparatus.

30. A jacking device for assisting an electric apparatus with movement, the electric apparatus comprising a machine body module, a motion module capable of being moved and rotated on the machine body module, and a support arm disposed between the motion module and the machine body module and comprising a pivot end and a push end, in which the push end of the support arm at least movably transmits power to the jacking device, the jacking device comprising:

a slave portion receiving the power transmitted from the push end of the support arm of the electric apparatus; and a link portion pivoted to the slave portion, comprising a free end capable of being motioned between a first position and a second position to push the motion module of the electric apparatus for movement when the slave portion is motioned in response to the power transmitted from the push end of the support arm of the electric apparatus;

wherein the slave portion and the link portion are disposed on a seat which is configured with a rail, and the slave portion is motioned along the rail.

31. A jacking device for assisting an electric apparatus with movement, the electric apparatus comprising a machine body module, a motion module capable of being moved and rotated on the machine body module, and a support arm disposed between the motion module and the machine body module and comprising a pivot end and a push end, in which the push end of the support arm at least movably transmits power to the jacking device, the jacking device comprising:

a slave portion receiving the power transmitted from the push end of the support arm of the electric apparatus; and a link portion pivoted to the slave portion, comprising a free end capable of being motioned between a first position and a second position to push the motion module of the electric apparatus for movement when the slave portion is motioned in response to the power transmitted from the push end of the support arm of the electric apparatus;

wherein the free end of the link portion is configured with a roller.

\* \* \* \* \*